United States Patent
Kim (10) Patent No.: US 8,495,229 B2
(45) Date of Patent: Jul. 23, 2013

(54) METHOD OF DEFENDING AGAINST BATTERY EXHAUSTION ATTACK AND WIRELESS COMMUNICATION DEVICE AND RECORDING MEDIUM USING THE METHOD

(75) Inventor: Kyu-won Kim, Anyang-si (KR)

(73) Assignee: Samsung Electronics Co., Ltd., Suwon-si, Gyeonggi-do ( * ) Notice: Subject to any disclaimer, the term of this patent is extended or adjusted under 35 U.S.C. 154(b) by 253 days.

(21) Appl. No.: 12/842,608

(22) Filed: Jul. 23, 2010

(65) Prior Publication Data
US 2011/0153855 A1    Jun. 23, 2011

(30) Foreign Application Priority Data
Dec. 21, 2009   (KR) .................... 10-2009-0128342

(51) Int. Cl.
*G06F 15/16*    (2006.01)
(52) U.S. Cl.
USPC ........................................ 709/229; 709/225
(58) Field of Classification Search
USPC ........ 709/225–229; 455/410, 411; 726/22–26
See application file for complete search history.

(56) References Cited

U.S. PATENT DOCUMENTS

| 7,065,067 | B2 * | 6/2006 | Song et al. ............... | 370/338 |
| 7,515,926 | B2 * | 4/2009 | Bu et al. .................. | 455/522 |
| 7,715,800 | B2 * | 5/2010 | Sinha ...................... | 455/67.11 |
| 7,945,955 | B2 * | 5/2011 | Katkar .................... | 726/22 |
| 8,036,690 | B1 * | 10/2011 | Delker et al. ........... | 455/512 |
| 8,069,483 | B1 * | 11/2011 | Matlock ................. | 726/23 |
| 8,087,085 | B2 * | 12/2011 | Hu et al. ................. | 726/24 |
| 2003/0115364 | A1 * | 6/2003 | Shu et al. ............... | 709/246 |
| 2003/0171120 | A1 * | 9/2003 | Mustapha .............. | 455/445 |
| 2005/0083230 | A1 * | 4/2005 | Harvey et al. ......... | 342/357.06 |
| 2005/0213553 | A1 * | 9/2005 | Wang ..................... | 370/349 |
| 2006/0094402 | A1 |   5/2006 | Kim | |
| 2006/0150250 | A1 * | 7/2006 | Lee et al. ............... | 726/23 |
| 2006/0197702 | A1 * | 9/2006 | Jones ..................... | 342/126 |

(Continued)

FOREIGN PATENT DOCUMENTS
KR    10-2006-0039810 A    5/2006

OTHER PUBLICATIONS

Timothy K. Buennemeyer, Faiz Munshi, Randy C. Marchany, and Joseph G. Tront, Battery-Sensing Intrusion Protection for Wireless Handheld Computers using a Dynamic Threshold Calculation Algorithm for Attack Detection, Proceedings of the 40th Hawaii International Conference on System Sciences—2007.*

(Continued)

*Primary Examiner* — Ario Etienne
*Assistant Examiner* — Sargon Nano
(74) *Attorney, Agent, or Firm* — Sughrue Mion, PLLC (57) ABSTRACT

Provided is a method of defending against a battery exhaustion attack on a wireless communication device. The method includes: determining whether a battery exhaustion attack against a first wireless communication device occurred based on a connection state between the first wireless communication device and at least one second wireless communication device; if it is determined to be a battery exhaustion attack against the first wireless communication device, defending the battery exhaustion attack using a communication module of the first wireless communication device; and if it is determined that the is no a battery exhaustion attack against the first wireless communication device, performing communication between the first wireless communication device and the at least one second wireless communication device according to the connection state.

15 Claims, 7 Drawing Sheets

U.S. PATENT DOCUMENTS

| | | | |
|---|---|---|---|
| 2006/0229022 A1* | 10/2006 | Bu et al. | 455/69 |
| 2008/0043686 A1* | 2/2008 | Sperti et al. | 370/338 |
| 2008/0295171 A1* | 11/2008 | Singh et al. | 726/23 |
| 2010/0302373 A1* | 12/2010 | Monsive, Jr. | 348/151 |

OTHER PUBLICATIONS

Timothy K. Buennemeyer, Theresa M. Nelson, Lee M. Clagett, John P. Dunning, Randy C. Marchany, and Joseph G. Tront, Mobile Device Profiling and Intrusion Detection using Smart Batteries, Proceedings of the 41st Hawaii International Conference on System Sciences—2008.*

Towards an Intrusion Detection System for Battery Exhaustion Attacks on Mobile Computing Devices Daniel C. Nash, Thomas L. Martin, Dong S. Ha, and Michael S. Hsiao 2005 IEEE.*

* cited by examiner

METHOD OF DEFENDING AGAINST BATTERY EXHAUSTION ATTACK AND WIRELESS COMMUNICATION DEVICE AND RECORDING MEDIUM USING THE METHOD

CROSS-REFERENCE TO RELATED PATENT APPLICATION

This application claims priority from Korean Patent Application No. 10-2009-0128342, filed on Dec. 21, 2009, in the Korean Intellectual Property Office, the disclosure of which is incorporated herein in its entirety by reference.

BACKGROUND

1. Field

Methods and apparatuses consistent with exemplary embodiments relate to a wireless communication device, and more particularly, to a method of defending against a battery exhaustion attack on a wireless communication device and a wireless communication device using the method.

2. Description of the Related Art

In general, wireless communication devices are mobile devices. It is very important to minimize battery consumption in these wireless communication devices.

Wireless communication devices may operate in, for example, a sleep mode so as to reduce the battery consumption. The sleep mode is a dormant mode of the wireless communication devices, and also is a low power mode in which only a minimum current required to wake-up the wireless communication devices is consumed. Accordingly, the sleep mode can be defined as a wake-up standby mode.

However, as a battery exhaustion attack on the wireless communication devices has been recently recognized as a denial of service (DOS) attack, the necessity for a wireless communication device having a defense function against a battery exhaustion attack of the DOS has been recognized.

SUMMARY

Exemplary embodiments provide a method of defending against a battery exhaustion attack on a wireless communication device, and a wireless communication device using the method and a computer-readable recording medium capable of performing the method.

According to an aspect of an exemplary embodiment, there is provided a method of defending against a battery exhaustion attack on a wireless communication device, the method including: determining whether a battery exhaustion attack against a first wireless communication device has occurred based on a connection state between the first wireless communication device and at least one second wireless communication device; if it is determined that the a battery exhaustion attack against the first wireless communication device has occurred, defending the first communication device from the battery exhaustion attack using a communication module of the first wireless communication device.

The method may further include outputting defense history information about the battery exhaustion attack, if a dormant mode of the first wireless communication device is released.

The method may further include outputting notice information about the battery exhaustion attack, if it is determined that the battery exhaustion attack against the first wireless communication device has occurred.

The determining whether the battery exhaustion attack against the first wireless communication device has occurred determines that the battery exhaustion attack against the first wireless communication device has occurred, if the connection state is that a connection request from the at least one second wireless communication device is received more than a threshold number of times within a predetermined period of time.

The determining whether the battery exhaustion attack against the first wireless communication device has occurred determines that the battery exhaustion attack against the first wireless communication device has occurred, if the connection state is a state that the at least one second wireless communication device that succeeded in the connection request to the first wireless communication device is not pairing with the first wireless communication device for a predetermined period of time.

The defending of the battery exhaustion attack includes: storing, in the communication module, identification information of the at least one second wireless communication device, if it is determined that the battery exhaustion attack against the first wireless communication device has occurred; and denying another connection request from the at least one second wireless communication device based on the stored identification information, where the denying is performed by the communication module.

The defending the battery exhaustion attack includes disabling the communication module.

The method may further include, if it is determined that the battery exhaustion attack against the first wireless communication device has not occurred, performing communication between the first wireless communication device and the at least one second wireless communication device according to the connection state.

Both the first wireless communication device and the at least one second wireless communication device are Bluetooth-based devices.

According to an aspect of another exemplary embodiment, there is provided a wireless communication device including: a processor which determines whether a battery exhaustion attack against a wireless communication device has occurred based on a connection state between at least one second wireless communication device and the wireless communication device; a communication module which defends against the battery exhaustion attack, if the processor determines that the battery exhaustion attack against the wireless communication device has occurred.

If a dormant mode of the wireless communication device is released, the processor may output information about a defense history from the battery exhaustion attack to a user interface.

If the processor determines that the battery exhaustion attack against the wireless communication device has occurred, the processor may output notice information about the battery exhaustion attack to a user interface.

The processor may determine that the battery exhaustion attack against the wireless communication device has occurred, if the connection state is that a connection request from the at least one second wireless communication device is received more than a threshold number of times within a predetermined period of time.

If the connection state is a state that the second wireless communication device that succeeds in the connection request to the wireless communication device is not pairing with the wireless communication device for a predetermined period of time, the processor may determine that the battery exhaustion attack against the wireless communication device has occurred.

The processor stores, in the communication module, identification information of the second wireless communication device, if the processor determines that the battery exhaustion attack against the wireless communication device has occurred. The communication module denies a connection request from the at least one second wireless communication device based on the stored identification information.

If the processor determines that the battery exhaustion attack against the wireless communication device has occurred, the processor disables the communication module. If the processor determines that the battery exhaustion attack against the wireless communication device has not occurred, the communication module of the wireless communication device performs communication with the at least one second wireless communication device according to the connection state.

According to an another aspect of an exemplary embodiment, there is provided a method of defending a wireless communication device against a battery exhaustion attack, the method comprising: receiving by the wireless communication device a connection request from another wireless communication device; determining whether the connection request is the battery exhaustion attack based on connection information; and disabling processing of the connection request from the other wireless communication device in the wireless communication device if it is determined that the battery exhaustion attack is occurring.

The determining whether the connection request is the battery exhaustion attack comprises at least one of: comparing a number of connection requests received from the other wireless communication device within a predetermined period of time with a threshold, and determining that the connection request is the battery exhaustion attack if the number of connection requests exceeds the threshold, and comparing pairing time of the other wireless communication device with the wireless communication device with a time threshold, and determining that the connection request is the battery exhaustion attack if the pairing time exceeds the time threshold.

The disabling the processing of the connection request comprises disabling a communication module of the wireless device.

The method further comprising: outputting information notifying that the battery exhaustion attack is occurring; and outputting history information of the battery exhaustion attack if the wireless communication device wakes up from a sleep mode.

According to an aspect of another exemplary embodiment there is provided a computer readable recording medium having embodied thereon a computer program for executing the method of defending against a battery exhaustion attack, wherein the method of defending against the battery exhaustion attack a recording medium performed in a similar way as the method of defending against the battery exhaustion attack on the wireless communication device.

BRIEF DESCRIPTION OF THE DRAWINGS

The above and other aspects will become more apparent by describing in detail exemplary embodiments thereof with reference to the attached drawings in which.

DETAILED DESCRIPTION OF EXEMPLARY EMBODIMENTS

Description will now be made in detail of exemplary embodiments with reference to the accompanying drawings.

Figure 1:
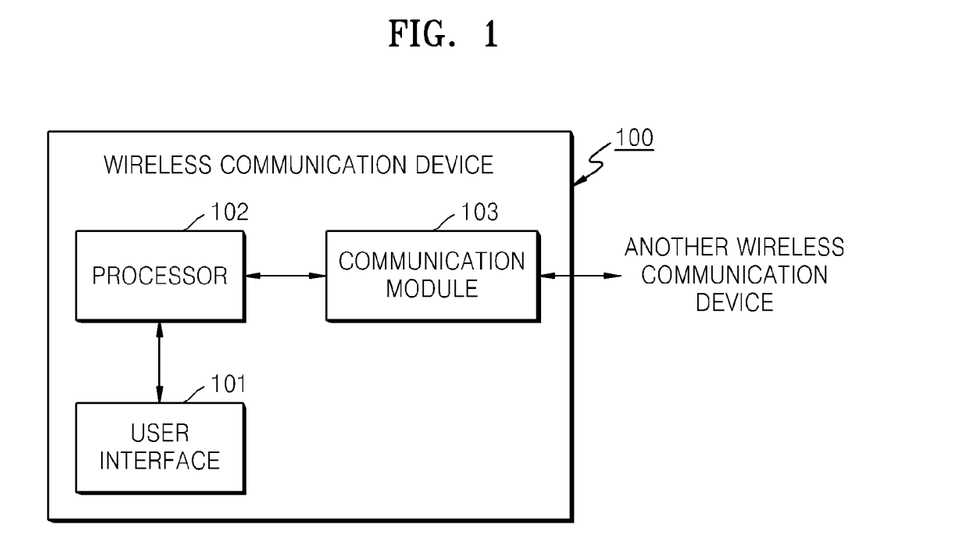
FIG. 1 is a block diagram illustrating a wireless communication device according to an exemplary embodiment.

FIG. 1 is a block diagram illustrating a wireless communication device 100 according to an exemplary embodiment. The wireless communication device 100 may be defined as a mobile device. The wireless communication device 100 may be a wireless communication specification-based device, such as a Bluetooth-based device. The wireless communication device 100 may be a mobile computer, a mobile phone, a headset, a personal digital assistant (PDA), a personal computer (PC), a printer, or the like.

Referring to FIG. 1, the wireless communication device 100 includes a user interface 101, a processor 102, and a communication module 103.

The user interface 101 may include at least one input/output element (not shown) for interfacing between a user and the wireless communication device 100. That is, the user interface 101 may include elements, such as a microphone, a touchpad, a keypad, a display, a keyboard, a mouse, a pen, a stylus, a voice recognition device, buttons, at least one speaker, etc. However, the elements that may be included in the user interface 101 are not limited thereto.

The user interface 101 may input user information for releasing a dormant mode of the wireless communication device 100 or output battery exhaustion attack notice information about the wireless communication device 100 or defense history information about a defense history from a battery exhaustion attack. The release of the dormant mode may be referred to as an establishment of a wake-up mode, a release of a wake-up standby mode, a release of an idle mode, a release of a sleep mode, or a release of a suspend mode.

The battery exhaustion attack notice information about the wireless communication device 100 and the defense history information about a defense history from a battery exhaustion attack may be output through a display or a speaker included in the user interface 101. The display and speaker may be provided separately from the user interface 101. The defense history information about a defense history from a battery exhaustion attack may be output when the dormant mode of the wireless communication device 100 is released. For example, when the dormant mode of the wireless communication device 100 is released, defense history information may be output. For example, the defense history information may be as follows: "Since device A has continuously attempted a connection request, a communication mode is released", "Since device A has continuously attempted a connection request, the connection request of device A is blocked", or "Since a communication module has not been used for a predetermined period of time, access of the communication module is blocked".

The processor 102 controls all functions of the wireless communication device 100 and may be defined as a microprocessor. The processor 102 may control functions of the user interface 101 and the communication module 103, and may also analyze and execute information that is input from the user interface 101.

The processor 102 determines whether there is a battery exhaustion attack to the wireless communication device 100, on the basis of a connection state between at least one wireless communication device (not shown), which is not pairing with the wireless communication device 100, and the wireless communication device 100.

Figure 2:
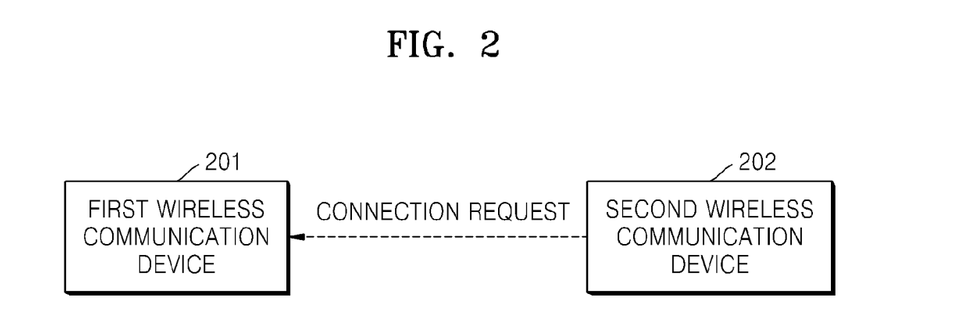
FIG. 2 is a diagram illustrating a relationship between wireless communication devices in order to describe a battery exhaustion attack, according to an exemplary embodiment.

FIG. 2 is a diagram illustrating a relationship between wireless communication devices in order to describe a battery exhaustion attack, according to an exemplary embodiment. In FIG. 2, a first wireless communication device 201 may correspond to the wireless communication device 100 of FIG. 1. As illustrated in FIG. 2, if a connection request from a second wireless communication device 202 that is not pairing with the first wireless communication device 201 is received more than a threshold number of times within a predetermined period of time, the processor 102 may determine that the connection request is a battery exhaustion attack by the second wireless communication device 202 on the first wireless communication device 201.

It may be determined whether a plurality of connection requests are received from the second wireless communication device 202 within a predetermined period of time, on the basis of identification information of the second wireless communication device 202. That is, if a plurality of connection requests including the same identification information are received within a predetermined period of time, the processor 102 compares the number of received connection requests and a threshold number and determines whether the number of connection requests is greater than the threshold number. When the second wireless communication device 202 is a Bluetooth-based device, the identification information may be a Bluetooth device address (BD_ADDR).

The first wireless communication device 201 may be defined as a slave device or a client device, and the second wireless communication device 202 may be defined as a master device or a server device. The predetermined period of time and the threshold number may be determined in advance and may be changed by a user. For example, if more than five connection requests are received within 30 minutes, the processor 102 may determine that the connection request of the second wireless communication device 202 is a battery exhaustion attack on the first wireless communication device 201. Such method of determining the battery exhaustion attack may also be used to determine a battery exhaustion attack by a service discovery protocol (SDP) request message (SDP_ServiceSearchRequest, SDP_ServiceAttributeRequest, and SDP_ServiceSearchAttributeRequest).

A pairing process is a connection attempt process for data transmission between the wireless communication devices. The pairing process may be defined as a process in which if a device attempting connection broadcasts an inquiry message for searching for another device with which to communicate, another device that is in an inquiry scan state sends an inquiry response including its own identification information to the device that has broadcast the inquiry message, and then enters a state for establishing a connection (a page scan state in a Bluetooth specification).

Figure 3:
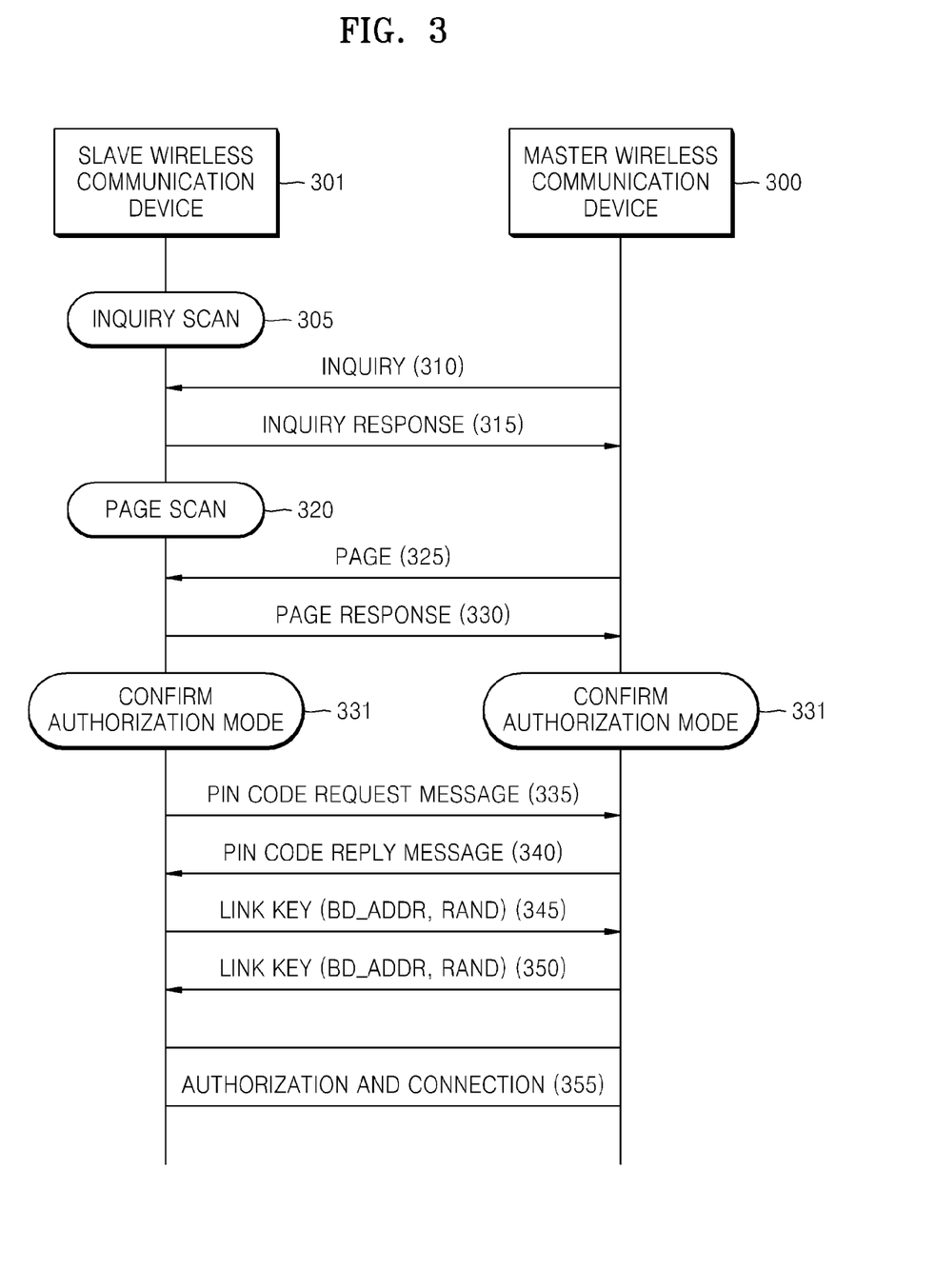
FIG. 3 is a diagram of a pairing process between Bluetooth-based wireless communication devices, according to an exemplary embodiment.

However, as illustrated in FIG. 3, processes including transmission, authorization, and connection of an inquiry message may be defined as a pairing process. FIG. 3 is a diagram of a pairing process between Bluetooth-based wireless communication devices, according to an exemplary embodiment.

Referring to FIG. 3, a master wireless communication device 300 broadcasts an inquiry message in order to search for a slave wireless communication device 301 that the master wireless communication device 300 desires to connect to in Operation 310. In this instance, the slave wireless communication device 301 is in an inquiry scan state 305, and the slave wireless communication device 301 may be a device that the master wireless communication device 300 desires to connect to or does not desire to connect to.

In Operation 315, the slave wireless communication device 301, which has received the inquiry message, sends a response including a BD_ADDR, clock information, etc., to the master wireless communication device 300, and then enters a page scan state 320 for establishing a connection. The inquiry message is sent not only to the slave wireless communication device 301, but also to a wireless communication device (not shown) that is around the master wireless communication device 300, and thus the above-described process may also be performed for the other wireless communication device.

In Operation 325, the master wireless communication device 300 sends a page message for synchronization to the slave wireless communication device 301 with reference to the received BD_ADDR and clock information. In Operation 330, the slave wireless communication device 301 sends a page response message including an identification (ID) packet to the master wireless communication device 300 as a response to the page message sent by the master wireless communication device 300. The ID packet may include various pieces of information about the slave wireless communication device 301. The information may be about a manufacturing company, a hex code, whether the slave wireless communication device 301 is a headset or a terminal, and the like.

In Operation 331, if an authorization mode of the slave wireless communication device 301 is in a security mode, the slave wireless communication device 301 sends a PIN code request message to the master wireless communication device 300 for establishing a link, in Operation 335. In Operation 340, the master wireless communication device 300 sends a PIN code to the slave wireless communication device 301. If the PIN code that is sent from the master wireless communication device 300 is correct, the master wireless communication device 300 and the slave wireless communication device 301 mutually send and receive a link key, respectively, with a BD_ADDR and a random number (RAND) to each other, in Operations 345 and 350, and then perform authorization and connection processes using the link key, in Operation 355.

In Operation 331, if an authorization mode of the slave wireless communication device 301 is not in a security mode, Operation 335 and Operation 340 respectively are skipped, and Operation 345 and Operation 350 are performed to send and receive the link key, and then the authorization and connection processes are performed in Operation 355.

Figure 4:
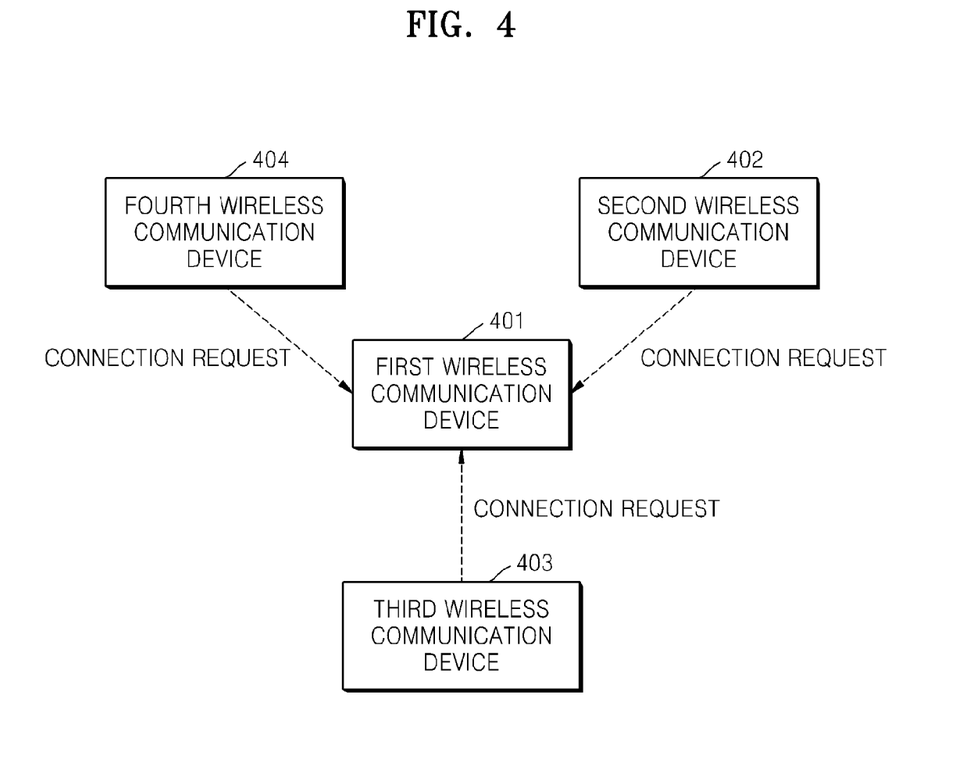
FIG. 4 is a diagram illustrating a relationship between wireless communication devices in order to describe a battery exhaustion attack, according to another exemplary embodiment.

FIG. 4 is a diagram illustrating a relationship between wireless communication devices in order to describe a battery exhaustion attack, according to another exemplary embodiment. In FIG. 4, a first wireless communication device 401 corresponds to the wireless communication device 100 of FIG. 1, and second through fourth wireless communication devices 402 through 404 are wireless communication devices that perform a battery exhaustion attack against the first wireless communication device 401.

Referring to FIG. 4, if a connection request from each of the second through fourth wireless communication devices 402 through 404 having different identification information is received more than a threshold number of times within a predetermined period of time, the processor 102 may determine that the connection request is a battery exhaustion attack against the first wireless communication device 401.

The second through fourth wireless communication devices 402 through 404 of FIG. 4 may be the same wireless communication device having different identification information. That is, when the second wireless communication device 202 of FIG. 2 performs requests for connection while changing the identification information as if a plurality of wireless communication devices exist, the processor 102 may determine the battery exhaustion attack as described above in FIG. 4. The predetermined period of time and the threshold number may be determined in advance or may be changed by a user. For example, if more than ten connection requests are received from a plurality of wireless communication devices within 10 minutes, the processor 102 may determine that the connection request is a battery exhaustion attack.

Figure 5:
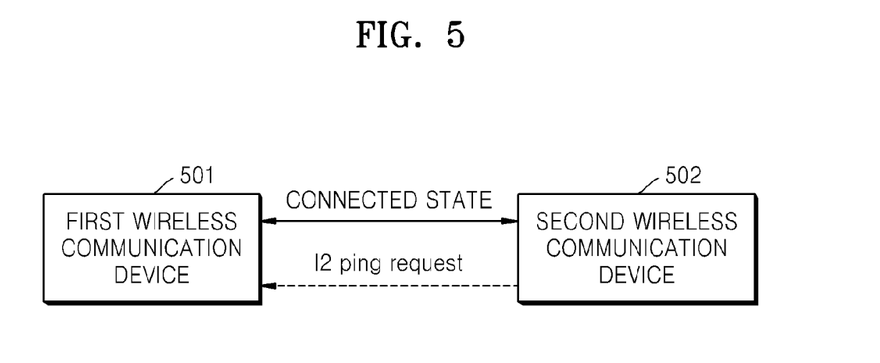
FIG. 5 is a diagram illustrating a relationship between wireless communication devices in order to describe a battery exhaustion attack, according to another exemplary embodiment.

FIG. 5 is a diagram illustrating a relationship between wireless communication devices in order to describe a battery exhaustion attack, according to another exemplary embodiment.

In FIG. 5, a first wireless communication device 501 may correspond to the wireless communication device 100 of FIG. 1, and a second wireless communication device 502 is a wireless communication device that performs a battery exhaustion attack against the first wireless communication device 501.

Referring to FIG. 5, when a connection between the first wireless communication device 501 and the second wireless communication device 502 succeeds, if a state where the second wireless communication device 502 is not pairing with the first wireless communication device 501 is maintained for a predetermined period of time, the processor 102 may determine that the connection request is based on a battery exhaustion attack on the first wireless communication device 501 by the second wireless communication device 502.

For example, in a case of a wireless communication device executing a Linux application such as l2ping, the wireless communication device may perform a connection request only once and then may send an "l2cap echo request" packet in a non-pairing state. In this instance, the first wireless communication device 501 sends an "l2cap echo response" packet to the second wireless communication device 502. As such, since an electrical signal is continuously sent to the processor 102 connected to the communication module 103 by successfully connecting in only one connection request, the processor 102 is prevented from entering a dormant mode. In addition, even if a different type of l2cap signaling packet than the "l2cap echo request" packet is sent in a successful connection state, a battery exhaustion attack is effective. Thus, as described above, when the non-pairing state is maintained for a predetermined period of time in a successful connection state, the processor 102 should determine that the successful connection state is based on a battery exhaustion attack.

In FIG. 5, since a battery exhaustion attack may be performed using a "SDP request" packet instead of a "l2cap request" packet, the processor 102 may determine a battery exhaustion attack according to whether the "SDP request" packet is received or not, after the connection is established.

If it is determined to be a battery exhaustion attack, the processor 102 controls the communication module 103 to defend against the battery exhaustion attack. That is, if it is determined to be a battery exhaustion attack, the processor 102 may disable the communication module 103. The disabling of the communication module 103 may be performed by blocking power to the communication module 103 using an enable pin included in the communication module 103.

Figure 6:
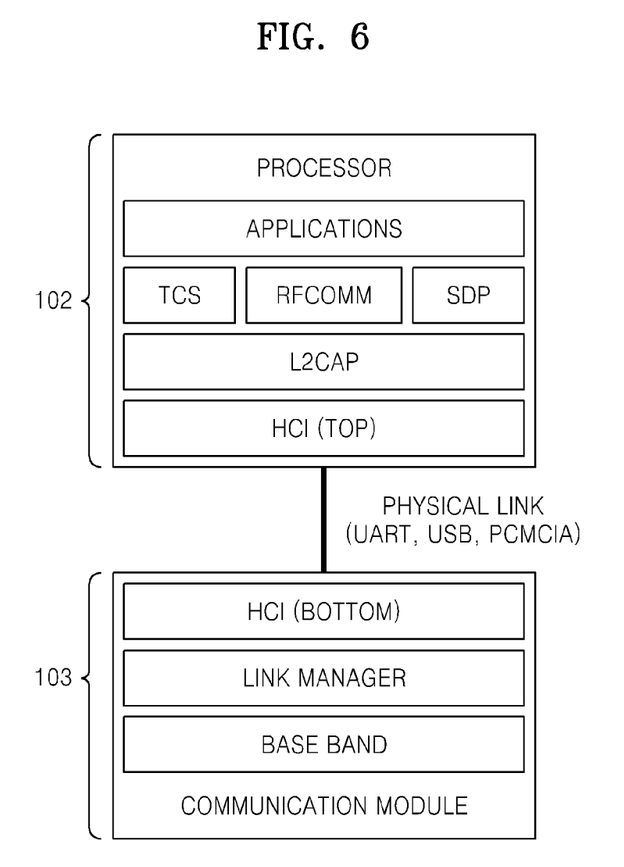
FIG. 6 is a diagram illustrating a protocol stack between a processor and a communication module of FIG. 1, according to an exemplary embodiment.

Also, when the communication module 103 is a Bluetooth-based communication module, and the processor 102 controls the communication module 103 using a host controller interface (HCI), a protocol stack between the processor 102 and the communication module 103 may be defined as illustrated in FIG. 6. FIG. 6 is a diagram illustrating a Bluetooth-based protocol stack according to an exemplary embodiment. Referring to FIG. 6, the processor 102 and the communication module 103 are connected to each other via a physical link. L2CAP (Logical Link Control and Adaptation Protocol) layer in FIG. 6 is layered over the Baseband Protocol and resides in the data link layer. L2CAP layer provides connection-oriented and connectionless data services to upper layer protocols with protocol multiplexing capability, segmentation and reassembly operation, and group abstraction. SDP (Service Discovery Protocol) in FIG. 6 allows a device to discover services supported by other devices, and their associated parameters. For example, when connecting a mobile phone to a Bluetooth headset, SDP will be used for determining which Bluetooth profiles are supported by the headset and the protocol multiplexer settings needed to connect to each of them. HCI (Host/Controller Interface) in FIG. 6 is a standardized communication between the host stack (e.g. a PC or mobile phone OS) and the controller (the Bluetooth IC). RFCOMM (Radio Frequency Communications) in FIG. 6 is the cable replacement protocol used to create a virtual serial data stream. TCS (Telephony Control Protocol) is a protocol that defines the call control signaling for the establishment of voice and data calls between Bluetooth devices. Applications in FIG. 6 are Bluetooth applications, for example, wireless control of and communication between a mobile phone and a hands-free headset. A Link manager of FIG. 6 is function that can setup, manage and terminate communication channels between devices. As described above, when the HCI is used, the processor 102 sends a HCI_reset command from among HCI controller & baseband commands to the communication module 103 so as to allow the communication module 103 to enter a standby mode, or the processor 102 sends a HCI_Write_Scan_Enable command and a command parameter from among the HCI controller & baseband commands to the communication module 103 so that the communication module 103 does not to enter a page scan state.

As such, when the communication module 103 is disabled, if a dormant mode of the wireless communication device 100 is released by a user's request, the processor 102 may output a message indicating that a particular device (device identification information or a name of a device may also be used) continuously, attempted a connection request, and thus the communication module 103 is disabled through the user interface 101. In this instance, if a device that performed a battery exhaustion attack is not known, the processor 102 may find out the name of the device by using a name discovery process.

Also, if it is determined that a connection state is based-on a battery exhaustion attack, the processor 102 may store identification information of the wireless communication device performing the battery exhaustion attack in the communication module 103 and allow the communication module 103 to independently deny any following connection request from this wireless communication device by using the stored identification information. For this, the communication module 103 may include a memory (not shown) for storing the identification information. The memory (not shown) may be a flash memory. The communication module 103 may further include a processor (not shown) for independently denying a connection request using the identification information stored in the memory. The communication module 103 may include a radio frequency (RF) and a baseband circuit. The memory included in the communication module 103 may store basic firmware. The above-described method of defending against a battery exhaustion attack may be defined as a method of blocking access of the wireless communication device having specific identification information.

The specific identification information stored in the memory included in the communication module 103 may be a plurality of pieces of specific identification information, which will be defined as a spam list. As such, as the communication module 103 independently denies a connection request, the processor 102 may store the identification information of the wireless communication device, which was denied the connection request, in the communication module 103 and then remain in a dormant mode. For example, if a page message is received from the wireless communication device having its identification information stored in the communication module 103, the communication module 103 recognizes that the wireless communication device malevolently performed a battery exhaustion attack on the basis of the identification information, does not perform a page response, and disconnects connection between the wireless communication device and the communication module 103.

For this, a HCI command may be newly added. An opCode command field (OCF) of an opCode group field (OGF) of HCI controller & baseband commands of a Bluetooth spec is now using up to 0x005F. Accordingly, new HCI commands may be added as follows. These new HCI commands are sent from the processor 102 to the communication module 103 in order to control the communication module 103.

1) HCI_Add_Bad_Addr (OCF: 0x0060) is an additional command of a malevolent BD_ADDR. When the BD_ADDR is encoded in a unicode transformation format (UTF)-8, a 12 octet field for the BD_ADDR is sufficient, and thus the HCI_Add_Bad_Addr is inserted into a parameter. In this instance, the communication module 103 returns the number of the BD_ADDR capable of being additionally inserted into a return parameter to the processor 102.

2) HCI_Read_Bad_Addr (OCF: 0x0061) is a read command of a malevolent BD_ADDR. A list of malevolent wireless communication devices is read form the communication module 103 using the HCI_Add_Bad_Addr as a HCI event. The list may be output through the user interface 101.

3) HCI_Del_Bad_Addr (OCF: 0x0062) is a delete command of a malevolent BD_ADDR. When the BD_ADDR that a user does not desire is stored in a memory of the communication module 103, the BD_ADDR is deleted using the HCI_Add_Bad_Addr.

The above commands are written on the basis of a write local name command, and thus these commands may be added to a Bluetooth spec.

When the above commands are used, if the processor 102 determines that a battery exhaustion attack is occurring, the processor 102 stores the BD_ADDR of the attacking wireless communication device in a memory included in the communication module 103 by using a new HCI_Add_Bad_Addr command. After that, if a battery exhaustion attack occurs again, the communication module 103 may defend against a malevolent attack by itself without involving the processor 102. The aforementioned OCF numbers and the command names are not limited thereto, and thus may be variously changed.

When identification information about the malevolent wireless communication device is stored in the communication module 103, if a dormant mode of the wireless communication device 100 is released so as to allow a user to recognize the identification information, the processor 102 sends a message of "Since device A has continuously attempted a connection request, access of the corresponding device was blocked" to the user interface 101. The "device A" is a malevolent wireless communication device.

Such inappropriate connection request is blocked in the communication module 103, so that the processor 102 may remain in a dormant mode.

Also, if the HCI command is not transmitted for a predetermined period of time, the processor 102 may automatically disable the communication module 103. In this instance, if a dormant mode is released by a user, and thus the processor 102 may output a message of "Since the communication module has not been used for a predetermined period of time, access of the communication module is blocked" via the user interface 101.

When the communication module 103 of FIG. 1 is Bluetooth-based, the wireless communication device 100 may be defined as a Bluetooth-based wireless communication device or a Bluetooth-based mobile device.

Figure 7:
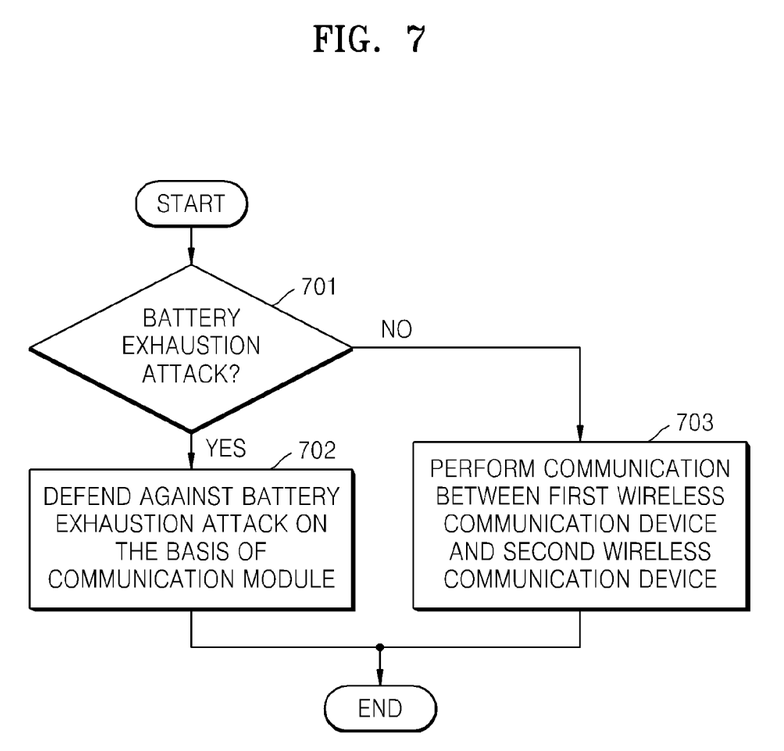
FIG. 7 is a flowchart illustrating a method of defending against a battery exhaustion attack, according to an exemplary embodiment.

FIG. 7 is a flowchart illustrating a method of defending against a battery exhaustion attack, according to an exemplary embodiment. Referring to FIG. 7, the wireless communication device 100 determines whether a battery exhaustion attack (Operation 701) occurs. The determination of the battery exhaustion attack may be performed on the basis of a connection state between the wireless communication devices as described, for example, with reference to FIGS. 1 through 5.

If it is determined that a battery exhaustion attack on the wireless communication device 100 occurs, the battery exhaustion attack is defended using the communication module 103 included in the wireless communication device 100 (Operation 702). The exemplary process of defending against the battery exhaustion attack may be performed, as described with reference to FIGS. 1 through 5.

Otherwise, if it is determined that a battery exhaustion attack on the wireless communication device 100 does not occur, the wireless communication device 100 performs communication between the wireless communication devices according to a connection state between the wireless communication device 100 and a second wireless communication device that is another device with which the wireless communication device 100 is to communicate (Operation 703).

Figure 8:
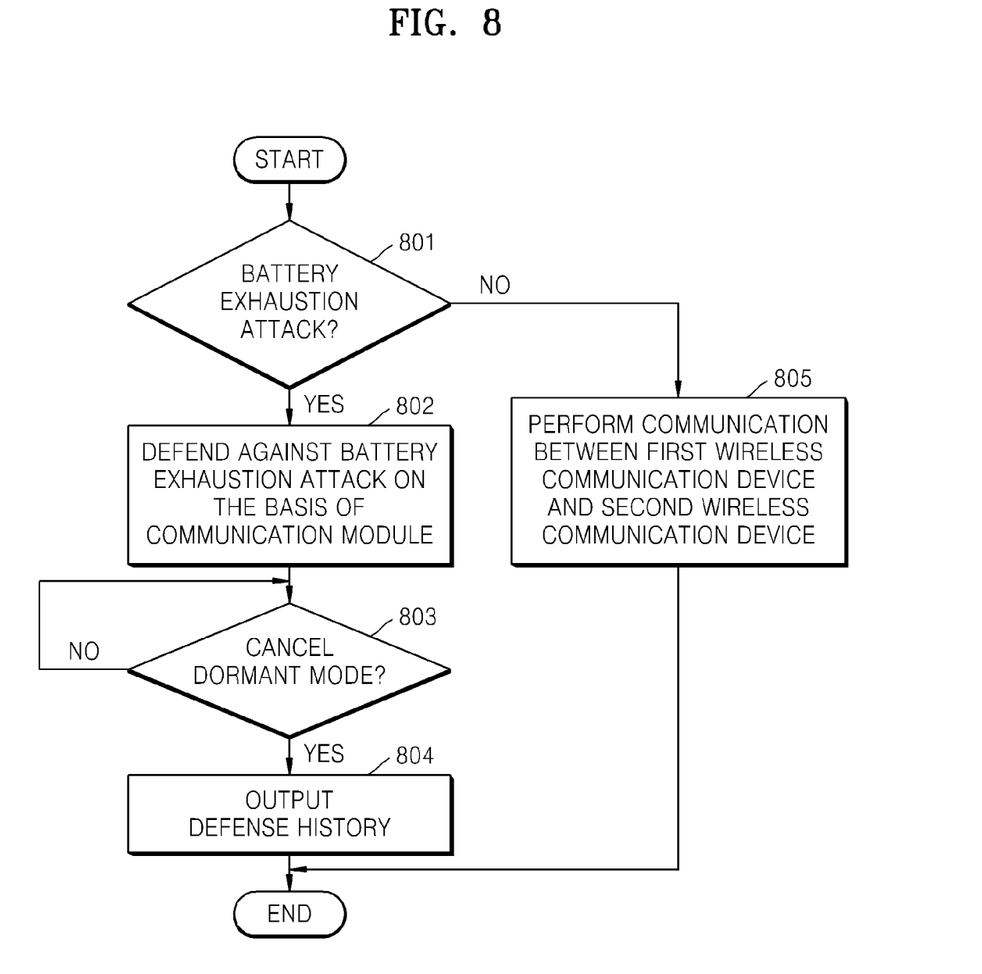
FIG. 8 is a flowchart illustrating a method of defending against a battery exhaustion attack, according to another exemplary embodiment.

FIG. 8 is a flowchart illustrating a method of defending against a battery exhaustion attack, according to another exemplary embodiment. Compared to FIG. 7, FIG. 8 further includes a function in which the wireless communication device 100 defends against the battery exhaustion attack and then outputs defense history information when the dormant mode is released. Accordingly, Operations 801, 802, and 805 are the same as Operations 701, 702 and 703, respectively, and thus their detailed descriptions will be omitted.

After defending against a battery exhaustion attack is performed using the communication module 103 included in the wireless communication device 100, if a dormant mode of the wireless communication device 100 is released using the user interface 101 in Operation 803, the wireless communication device 100 outputs defense history information in Operation 804. The defense history information may be determined according to contents of the battery exhaustion attack.

Figure 9:
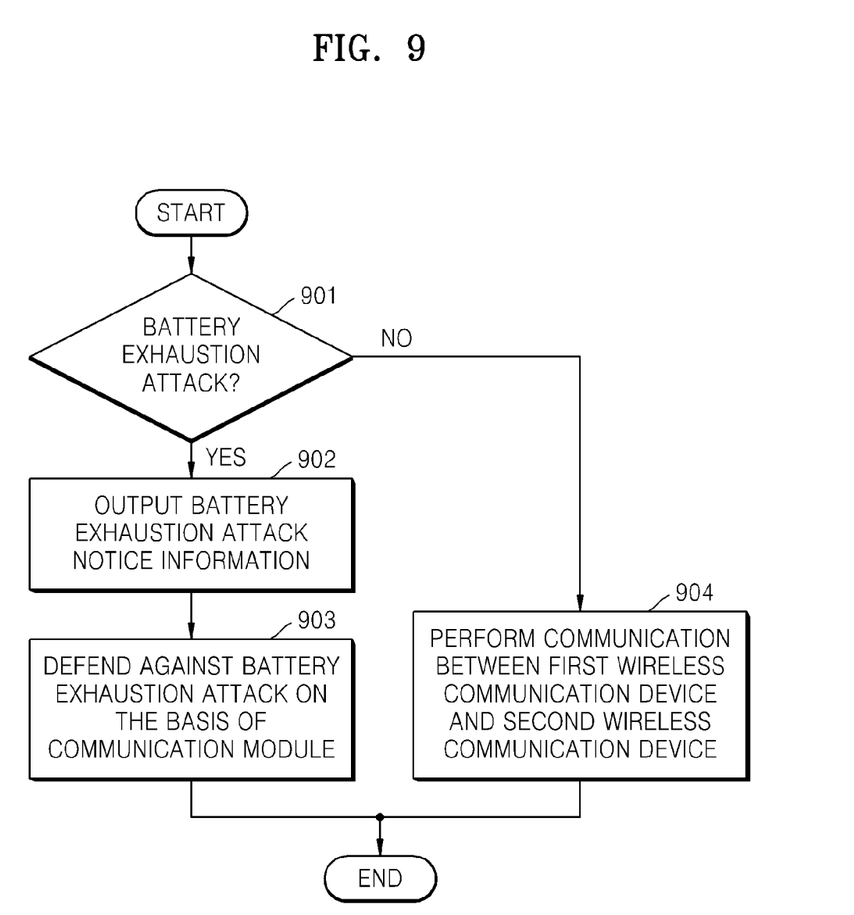
FIG. 9 is a flowchart illustrating a method of defending against a battery exhaustion attack, according to another exemplary embodiment.

FIG. 9 is a flowchart illustrating a method of defending against a battery exhaustion attack, according to another exemplary embodiment. Compared to FIG. 7, FIG. 9 further includes an operation of outputting battery exhaustion attack notice information to the wireless communication device 100. Accordingly, Operations 901, 903 and 904 are the same as Operations 701, 702 and 703, respectively, and thus their detailed descriptions will be omitted.

Accordingly, if it is determined that a battery exhaustion attack occurs in Operation 901, the wireless communication device 100 outputs battery exhaustion attack notice information through the user interface 101 (Operation 902). The battery exhaustion attack notice information may be output through an output device that is provided separately from the user interface 101. After outputting the notice information about the battery exhaustion attack, defending against the battery exhaustion attack is performed (Operation 903). The output device may be a speaker or a display that is provided separately from the user interface 101.

The exemplary embodiments can also be embodied as computer readable codes on a computer readable recording medium. The computer readable recording medium is any data storage device that can store data which can be thereafter be read by a computer system. Examples of the computer readable recording medium include read-only memory (ROM), random-access memory (RAM), CD-ROMs, magnetic tapes, floppy disks, optical data storage devices, and etc. The computer readable recording medium can also be distributed over network coupled computer systems so that the computer readable code is stored and executed in a distributed fashion.

It should be understood that exemplary embodiments described herein should be considered in a descriptive sense only and not for purposes of limitation. Descriptions of features or aspects within each embodiment should typically be considered as available for other similar features or aspects in other exemplary embodiments. Also, the description of the exemplary embodiments is intended to be illustrative, and not to limit the scope of the claims, and many alternatives, modifications, and variations will be apparent to those skilled in the art.

What is claimed is:

1. A method of defending against a battery exhaustion attack on a wireless communication device, the method comprising:
   determining, by a processor of a first wireless communications device, whether a battery exhaustion attack against the first wireless communication device has occurred based on a connection state between the first wireless communication device and at least one second wireless communication device;
   if it is determined that the battery exhaustion attack against the first wireless communication device has occurred, defending the first wireless communication device from the battery exhaustion attack using a communication module of the first wireless communication device;
   storing, in the communication module, identification information of the at least one second wireless communication device, if it is determined that the battery exhaustion attack against the first wireless communication device has occurred;
   denying, by the communication module independently from the processor, a connection request from the at least one second wireless communication device based on the stored identification information; and
   outputting defense history information about the battery exhaustion attack, if a dormant mode of the first wireless communication device is released,
   wherein the determining whether the battery exhaustion attack against the first wireless communication device as occurred determines that the battery exhaustion attack against the first wireless communication device has occurred if the connection state is that the at least one second wireless communication device that succeeded in a connection request to he first wireless communication device is not pairing with the first wireless communication device for a predetermined period of time.

2. The method of claim 1, further comprising outputting notice information about the battery exhaustion attack, if it is determined that the battery exhaustion attack against the first wireless communication device has occurred.

3. The method of claim 1, wherein the determining whether the battery exhaustion attack against the first wireless communication device has occurred determines that the battery exhaustion attack against the first wireless communication device has occurred, if the connection state is that a connection request from the at least one second wireless communication device is received more than a threshold number of times within a predetermined period of time.

4. The method of claim 1, wherein the defending the battery exhaustion attack comprises disabling the communication module.

5. The method of claim 1, wherein both the first wireless communication device and the at least one second wireless communication device are Bluetooth-based devices.

6. The method of claim 1 further comprising, if it is determined that the battery exhaustion attack against the first wireless communication device has not occurred, performing communication between the first wireless communication device and the at least one second wireless communication device according to the connection state.

7. A non-transitory computer readable recording medium having embodied thereon a computer program for executing the method of claim 1.

8. The method of claim 1, wherein the processor remains in a dormant state during the denying of the connection request from the at least one second wireless communication device.

9. A wireless communication device comprising:
   a user interface;
   a processor which determines whether a battery exhaustion attack against the wireless communication device has occurred based on a connection state between at least one second wireless communication device and the wireless communication device; and
   a communication module which defends against the battery exhaustion attack if the processor determines that the battery exhaustion attack against the wireless communication device has occurred,
   wherein the processor determines that the battery exhaustion attack against the wireless communication device has occurred, if the connection state is that the second wireless communication device that succeeds in a connection request to the wireless communication device is not pairing with the wireless communication device for a predetermined period of time, wherein the processor stores, in the communication module, identification information of the second wireless communication device, if the processor determines that the battery exhaustion attack against the wireless communication device has occurred, wherein the communication module denies a connection request from the at least one second wireless communication device independently from the processor based on the stored identification information, and wherein if a dormant mode of the wireless communication device is released, the processor outputs information about a defense history from the battery exhaustion attack to the user interface.

10. The device of claim 9,
wherein if the processor determines that the battery exhaustion attack against the wireless communication device has occurred, the processor outputs notice information about the battery exhaustion attack to the user interface.

11. The device of claim 9, wherein the processor determines that the battery exhaustion attack against the wireless communication device has occurred, if the connection state is that a connection request from the at least one second wireless communication device is received more than a threshold number of times within a predetermined period of time.

12. The device of claim 9, wherein if the processor determines that the battery exhaustion attack against the wireless communication device has occurred, the processor disables the communication module.

13. The device of claim 9, wherein both the wireless communication device and the at least one second wireless communication device are Bluetooth-based devices.

14. The device of claim 9, wherein if the processor determines that the battery exhaustion attack against the wireless communication device has not occurred, the communication module of the wireless communication device performs communication with the at least one second wireless communication device according to the connection state.

15. The device of claim 9, wherein the processor remains in a dormant state during the denying of the connection request from the at least one second wireless communication device.

* * * * *